US008520835B2

(12) United States Patent
Schley-May et al.

(10) Patent No.: US 8,520,835 B2
(45) Date of Patent: Aug. 27, 2013

(54) METHOD AND APPARATUS FOR PROVIDING POWER TO A NETWORK INTERFACE DEVICE VIA TELEPHONE LINES

(75) Inventors: James T. Schley-May, Nevada City, CA (US); Michael Henderson, Grass Valley, CA (US)

(73) Assignee: 2Wire, Inc., San Jose, CA (US)

( * ) Notice: Subject to any disclaimer, the term of this patent is extended or adjusted under 35 U.S.C. 154(b) by 1564 days.

(21) Appl. No.: 11/605,776

(22) Filed: Nov. 28, 2006

(65) Prior Publication Data

US 2007/0263852 A1 Nov. 15, 2007

Related U.S. Application Data

(60) Provisional application No. 60/793,090, filed on Apr. 18, 2006.

(51) Int. Cl.
*H04M 1/00* (2006.01)
*H04M 9/00* (2006.01)

(52) U.S. Cl.
USPC ............. 379/413; 379/395.01; 379/413.02

(58) Field of Classification Search
USPC ............. 379/413, 413.02, 395.01; 370/431, 370/389
See application file for complete search history.

(56) References Cited

U.S. PATENT DOCUMENTS

| 4,121,054 A | 10/1978 | Popkin |
|---|---|---|
| 4,157,567 A | 6/1979 | Scholz |
| 4,334,303 A | 6/1982 | Bertin et al. |
| 4,763,104 A | 8/1988 | Inoue et al. |
| 5,924,022 A | 7/1999 | Beasley et al. |
| 6,122,083 A | 9/2000 | Ohta et al. |
| 6,262,905 B1 | 7/2001 | Zhang et al. |
| 6,297,620 B1 * | 10/2001 | Goodrich, II ................ 320/152 |
| 6,345,390 B1 | 2/2002 | Eto et al. |
| 6,370,203 B1 | 4/2002 | Boesch et al. |
| 6,449,348 B1 | 9/2002 | Lamb et al. |
| 6,665,404 B2 | 12/2003 | Cohen |
| 6,975,723 B2 | 12/2005 | Scott et al. |
| 7,149,903 B1 | 12/2006 | Chan et al. |
| 7,305,006 B1 | 12/2007 | Bella |
| 7,415,242 B1 | 8/2008 | Ngan |
| 2002/0003873 A1 | 1/2002 | Rabenko et al. |
| 2002/0073434 A1 | 6/2002 | Pience |
| 2002/0090962 A1 | 7/2002 | Struhsaker et al. |
| 2002/0105931 A1 | 8/2002 | Heinonen et al. |
| 2002/0122496 A1 | 9/2002 | Klein-Reesink |
| 2002/0136394 A1 | 9/2002 | Snow et al. |

(Continued)

OTHER PUBLICATIONS

PCT International Preliminary Report on Patentability, PCT/US2007/007869 filed Mar. 28, 2007, mailed Oct. 30, 2008.

(Continued)

*Primary Examiner* — Simon Sing
*Assistant Examiner* — Simon King
(74) *Attorney, Agent, or Firm* — Head, Johnson & Kachigian, P.C.

(57) ABSTRACT

A method, apparatus, and system in which one embodiment includes a network interface device (NID) located outside a building and a power supply unit located inside the building. The power supply unit has an electrical isolation component and one or more ports that couple via a first phone line and a second phone line to the NID to provide isolated DC power to the NID.

14 Claims, 5 Drawing Sheets

(56) References Cited

U.S. PATENT DOCUMENTS

| | | |
|---|---|---|
| 2003/0068033 A1 | 4/2003 | Kiko |
| 2003/0215020 A1 | 11/2003 | Dong et al. |
| 2005/0094604 A1 | 5/2005 | Ozluturk et al. |
| 2005/0180561 A1 | 8/2005 | Hazani et al. |
| 2005/0256963 A1 | 11/2005 | Proctor, Jr. et al. |
| 2005/0272430 A1 | 12/2005 | Griebling |
| 2006/0092671 A1 | 5/2006 | Yamashita |
| 2006/0159116 A1* | 7/2006 | Gerszberg et al. ............ 370/431 |
| 2006/0203981 A1 | 9/2006 | Binder |
| 2006/0215771 A1 | 9/2006 | Scott et al. |
| 2006/0225098 A1 | 10/2006 | James et al. |
| 2007/0085631 A1 | 4/2007 | Larson et al. |
| 2007/0127713 A1* | 6/2007 | Schley-May et al. .... 379/413.02 |
| 2007/0242757 A1 | 10/2007 | Schley-May et al. |
| 2007/0263852 A1 | 11/2007 | Schley-May et al. |
| 2008/0235587 A1 | 9/2008 | Heie et al. |

OTHER PUBLICATIONS

PCT Search Report, International Application No. PCT/US2007/007869, International Filing Date Mar. 28, 2007, Mailed Oct. 9, 2007.

PCT Written Opinion of the International Searching Authority, International Application No. PCT/US2007/007869, International Filing Date Mar. 28, 2007, Mailed Oct. 9, 2007.

* cited by examiner

METHOD AND APPARATUS FOR PROVIDING POWER TO A NETWORK INTERFACE DEVICE VIA TELEPHONE LINES

RELATED APPLICATIONS

The present application is related to and hereby claims the priority benefit of commonly-owned U.S. Provisional Patent Application No. 60/793,090, entitled "NETWORK INTERFACE DEVICE" filed Apr. 18, 2006, by James T. Schley-May and Michael Henderson.

FIELD OF THE INVENTION

Embodiments of the invention generally relate to telecommunication systems used to provide broadband access. More particularly, an aspect of an embodiment of the invention relates to providing power to network interface devices.

BACKGROUND OF THE INVENTION

Typically, telecommunication systems that provide broadband access to residential customers contain a residential gateway which consists of an xDSL (any type of digital subscriber line generally communicated over copper lines) modem or xPON (any type of passive optical network generally communicated over optic fibers) interface combined with various local area networking (LAN) technologies to enable sharing the broadband access with other computers or devices within the residence. Wireless local area network standards and home phone line networking (HPNA) are examples of such LAN technologies. In addition, some telecommunication systems may provide a voice-over-internet-protocol (VOIP) feature to allow telephone calls via the broadband link. Some systems may, in addition to broadband access sharing, need to distribute broadband media content such as video streams into various locations within the residence.

Typically the residential gateway is located inside the house. However, it is desirable to locate the residential gateway at the network interface device (NID) outside the house. A NID is the point of demarcation between the Unbundled Network Element (UNE) loop and the end user's inside wire. Reasons for desirability of locating the residential gateway at the NID include to provide simplified installation wiring and to eliminate the need to have the user home when the bulk of installation occurs. Further, as fiber to the neighborhood rolls out, integration will be easier if the active electronics are already present at the NID. Also, installation practices can be merged between xPON and xDSL systems such that the primary network termination is the mere difference.

However, a significant problem in trying to locate the residential gateway at the NID is the problem of providing power. There is often no external source of Alternating Current (AC) power accessible at the NID location. Consequently, powering from inside the house is the general viable option.

Current schemes for providing power to the NID or other equipment not located close to conventional power sources involves the installation of separate wires between the NID or other equipment and the conventional power sources. These schemes often require creating holes in the exterior and/or interior walls of buildings. Additional labor and material expense is associated with this additional separate wiring.

SUMMARY OF THE INVENTION

Various methods, apparatuses, and systems are described in which a residential gateway is located at the network interface device and is powered with a power source inside the residence. In one embodiment, an apparatus includes a network interface device (NID) located outside a residence and a power supply unit located inside the residence. The power supply unit has an electrical isolation component and one or more ports that couple via a first phone line and a second phone line to the NID to provide isolated direct current (DC) power to the NID.

BRIEF DESCRIPTION OF THE DRAWINGS

The drawings refer to embodiments of the invention in which.

Figure 1:
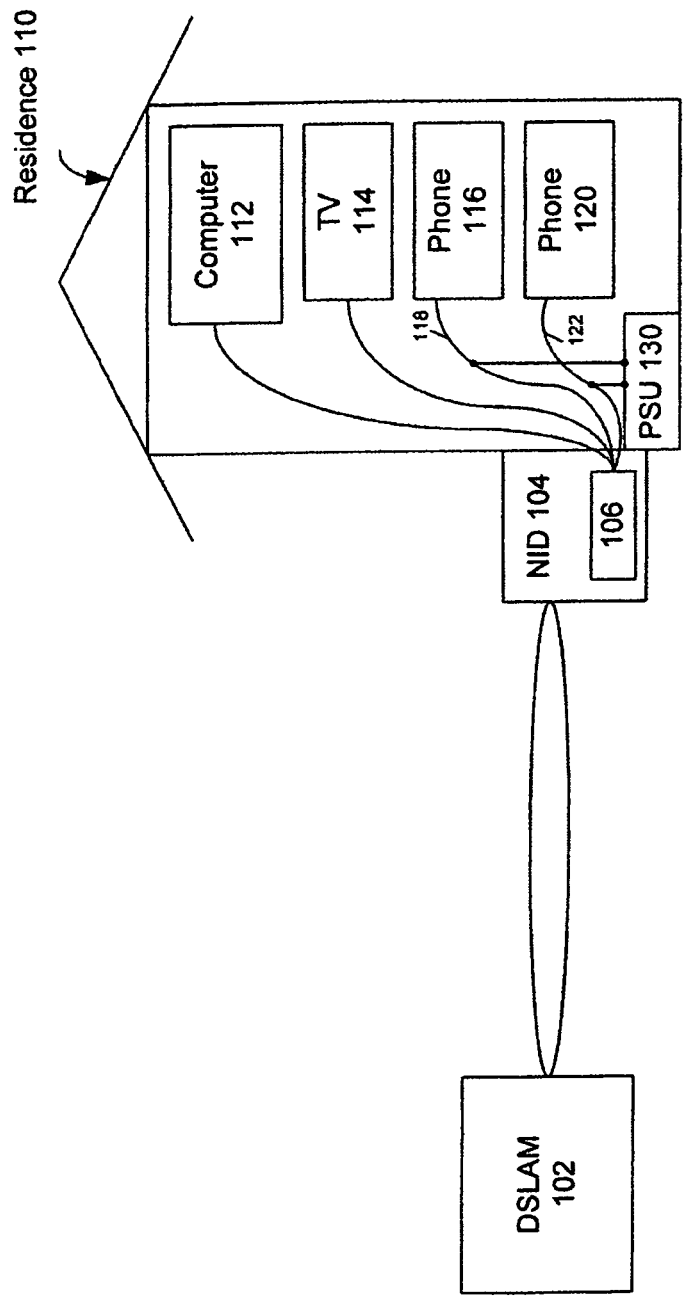
FIG. 1 shows a block diagram of an embodiment of a central office containing a Digital Subscriber Loop Access Multiplexer sending communications across an Unbundled Network Element (UNE) loop to a network interface device.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific signals, named components, connections, number of windings in a transformer, example voltages, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. The specific details set forth are merely exemplary. Further specific numeric references such as a first converter, may be made. However, the specific numeric reference should not be interpreted as a literal sequential order but rather interpreted that the first converter is different than a second converter. Thus, the specific details set forth are merely exemplary. The specific details may be varied from and still be contemplated to be within the spirit and scope of the present invention. The term coupled is defined as meaning connected either directly to the component or indirectly to the component through another component.

In general, various apparatuses and methods are described in which a network interface device (NID) is powered by an isolated DC power source. In one embodiment, an apparatus includes a NID located outside a residence and a power supply unit located inside the residence. The power supply unit has an electrical isolation component and one or more ports that couple via a first phone line and a second phone line to the NID to provide isolated DC power to the NID. The first phone line includes one wire from a first ring/tip pair and the second phone line includes one wire from a second ring/tip pair that couples between the power supply unit and the NID. The first and second phone lines provide two voice circuits to the residence and simultaneously provide a power circuit for the NID.

FIG. 1 shows a block diagram of an embodiment of a central office containing a Digital Subscriber Loop Access Multiplexer (DSLAM) sending communications across an Unbundled Network Element (UNE) loop to a network interface device (NID). A NID is the point of demarcation between the Unbundled Network Element (UNE) loop and the end user's inside wire. The DSLAM 102 sends communications to the NID 104 located outside a residence 110. The NID 104 includes a residential gateway 106 that routes various types of communications, such as data, voice, and video, into the residence 110. The communications may be sent to a computer 112, television 114, phone 116, and phone 120.

Voice data is sent from the residential gateway 106 located in the NID 104 to the phone 116 and the phone 120 via a first phone line 118 and a second phone line 122, respectively. A power supply unit (PSU) 130 located inside the residence 110 couples via the first phone line 118 and the second phone line 122 to the NID 104 to provide isolated (non-grounded) DC power to the NID 104. The PSU 130 is located close to both a conventional power source such as a 120 volt alternating current (AC) outlet and telephone wiring. The PSU 130 converts the energy from the conventional power source into a form compatible with low voltage, low current telephone wiring already present in the residence 110. In order to avoid induction or conduction of electrical noise into the telephone wiring of the residence 110, the outgoing power conductors of the PSU 130 and NID 104 are not connected to earth ground.

In one embodiment, the first phone line 118 has two wires in the form of a ring/tip pair. The second phone line 122 also has two wires in the form of a ring/tip pair. An isolated DC signal is sent from the PSU 130 to the NID 104 via one wire from the first phone line 118. The NID 104 returns the isolated DC signal to the PSU 130 via one wire from the second phone line 122. Thus, the first and second phone lines 118 and 122 provide two voice circuits to the residence 110 and simultaneously provide a power circuit for the NID 104.

The design for the NID 104 allows power to be delivered from an indoor plug-in device that is located within a residence 110 to power the NID 104 or other outdoor devices using telephone wires that are simultaneously being used for telephone service. Thus, the design for the NID 104 allows DC powering over two pairs of telephone lines while at the same time leaving them available for phone service. This telephone signal compatible DC power scheme enables the market in that having to install a new pair to feed power would be costly, or alternately, giving up one of the two existing pairs to feed power would reduce functionality. Note, some other outdoor mounted communication products, which use power for operation, may require a separate installation of wires leading from the outdoor device to a source of power. The design allows minimizing the expense of installing devices located external to a residence while providing service to their customers. This design does not require a separate installation of wires leading from the outdoor device to a source of power. The design allows borrowing one line from each of two tip/ring pairs and injecting power into the two lines at one location, recovering the power at a distant location from those two telephone lines. The design provides two voice circuits AND a non-interfering power circuit over the same two pairs of telephone lines.

The design allows equipment connected to home telephone wiring but without access to other standard AC electrical power sources to receive power through home telephone wiring while retaining use of the same wires for telephone use. The residence 110 may be any type of building, dwelling, or structure that has an internal power source and phone service.

Figure 2:
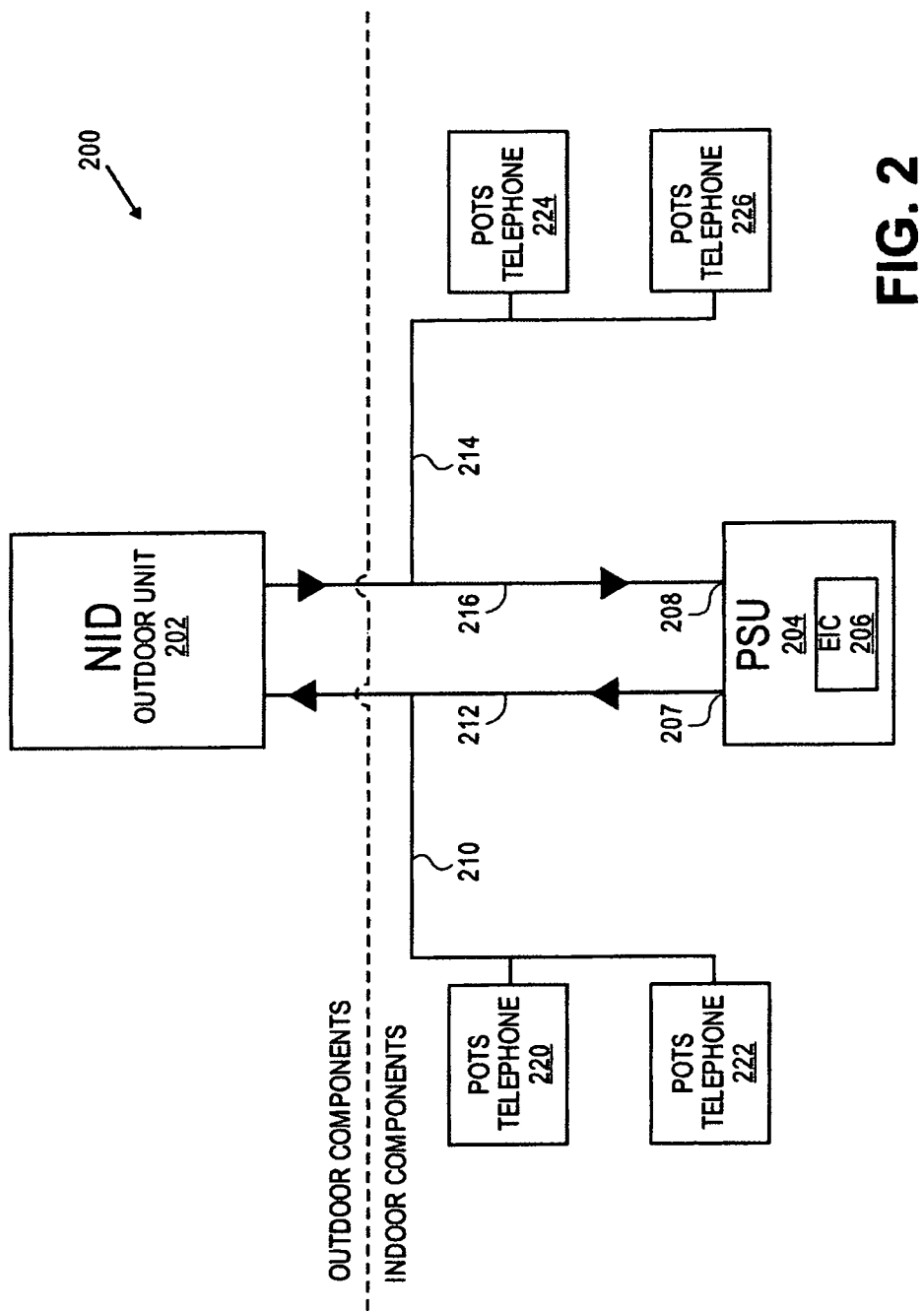
FIG. 2 shows a block diagram of an embodiment of providing DC power to a network interface device via telephone lines.

FIG. 2 shows a block diagram of an embodiment of providing DC power to a network interface device via telephone lines. The block diagram 200 includes a network interface device (NID) 202 located outside a residence and a power supply unit (PSU) 204 located inside the residence. The NID 202 performs interface functions, such as code conversion, protocol conversion, and buffering, required for communications to and from a network. The NID 202 converts each device protocol into a common transmission protocol.

The PSU 204 has an electrical isolation component (EIC) 206, an output port 207 and an input port 208 that couples via a first phone line 210 and a second phone line 214 to the NID to provide isolated DC power to the NID 202. The first phone line 210 includes one wire 212 from a first ring/tip pair and the second phone line 214 includes one wire 216 from a second ring/tip pair that couples between the power supply unit 204 and the NID 202. The first and second phone lines provide two voice circuits to the residence and simultaneously provide a power circuit for the NID 202.

In one embodiment, the PSU 204 includes the EIC 206 and output port 207 that sends an isolated DC signal to the NID 202 via the wire 212 of the first phone line 210 and the input port 208 that receives the isolated DC signal returning to the PSU 204 via the wire 216 of the second phone line 214. To avoid induction or conduction of electrical noise into the telephone wiring of the residence, the power conductors of the PSU 204 are not connected to earth ground. To avoid similar problems with electrical noise, the power input circuitry of the NID 202 at the residential location is also not connected to earth ground.

The electrical isolation component 206, such as a capacitor, a transformer, or a rectifier, generates isolated DC power across the wire 212 of the first phone line 210 (first ring/tip pair) and the wire 216 of the second phone line 214 (second ring/tip pair) that generates the isolated DC signal with less than 5 volt DC bias between each wire in the first ring/tip pair and also between each wire in the second ring/tip pair. Furthermore, the isolated DC signal generates approximately no AC impedance change between each wire in the first ring/tip pair and also between each wire in the second ring/tip pair. Thus, the power conducted through the two phone line network can be used to power equipment on the same two phone lines without interfering with the operation of those pieces of equipment.

In one embodiment, as illustrated in FIG. 2, power is provided to the residential gateway located at the NID 202 via the existing phone lines by the PSU 204 located inside the residence. Thus, two pairs of existing phone lines are used. This is accomplished, in part, by placing active electronics in the NID 202, and by having the internal power supply feeding a single wire from each of the two pairs of phone lines. Power may be supplied over the existing phone lines that can still be used for plain old telephone service (POTS) devices such as POTS telephones 220, 222, 224, and 226. Furthermore, the bidirectional communication may occur between the residential gateway and PSU 204. The residence with the residential gateway may be any type of building, dwelling, or structure that has an internal power source and phone service.

Telephones and other POTS devices, such as fax machines, answering machines, and analog modems, may also couple to the phone lines 210 and 214. Optional HPNA devices may also couple to the phone lines 210 and 214 via a filter.

Note, the above embodiments utilize direct current (DC) to conduct power from the PSU 204 to the NID 202, but alternating current (AC) power sources can be used as well. When the equipment using the telephone wire pairs for signaling does not require direct current connectivity, the signals can be coupled onto the pairs using non-ground referenced output devices, such as opto-couplers or transformers.

Figure 3:
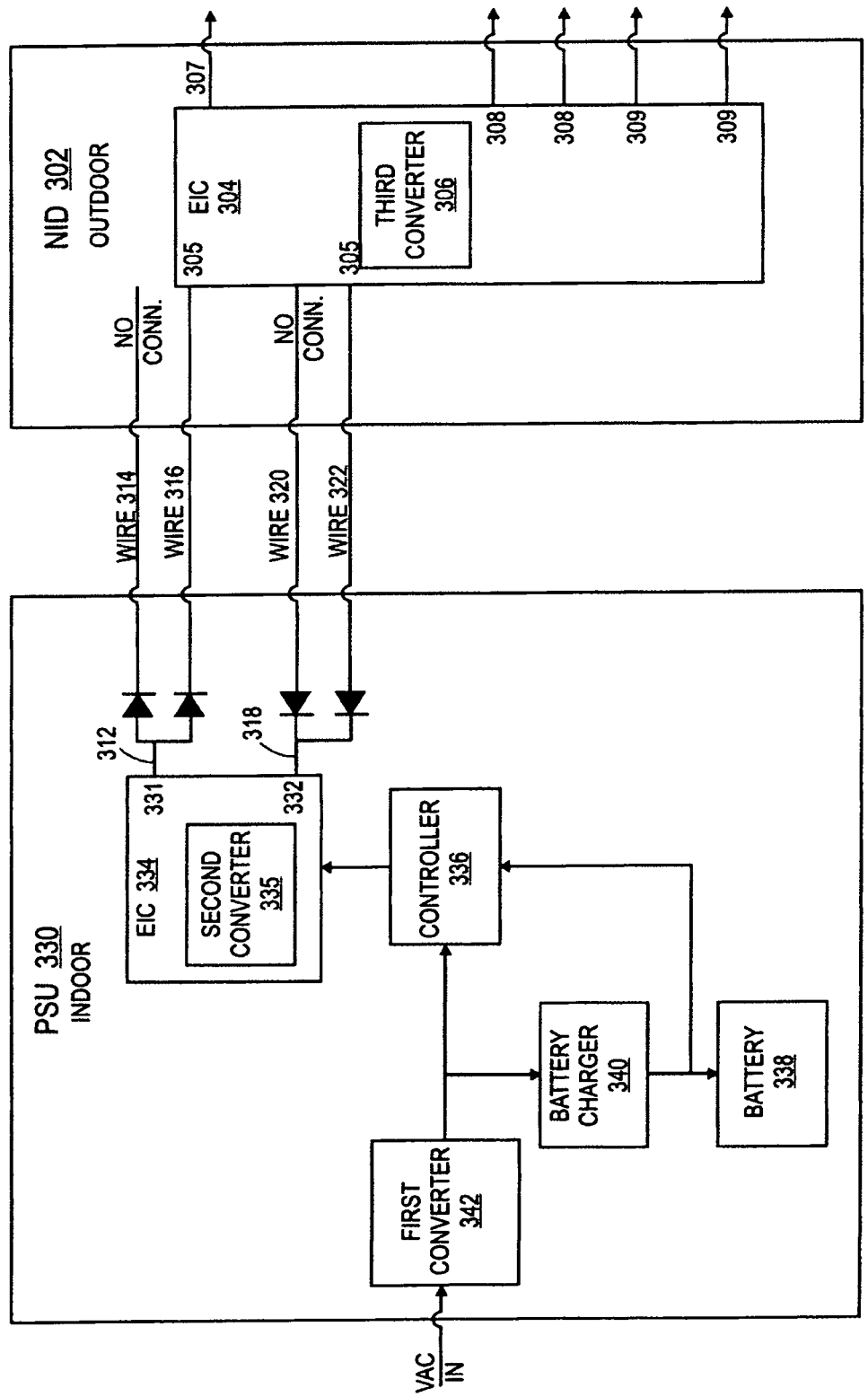
FIG. 3 shows a block diagram of another embodiment of providing DC power to a network interface device via telephone lines.

FIG. 3 shows a block diagram of another embodiment of providing DC power to a network interface device via telephone lines. The block diagram 300 includes a network interface device (NID) 302 located outside a residence or building and a power supply unit (PSU) 330 located inside the residence or building. The PSU 330 has an electrical isolation component (EIC) 334, an output port 331 and an input port 332 that couples via a first phone line 312 and a second phone line 318 to the NID 302 to provide isolated DC power to the NID 302. The first phone line 312 includes one wire 314 and one wire 316 that form a first ring tip pair. The second phone line 318 includes one wire 320 and one wire 322 that form a second ring tip pair. The wire 316 from the first ring/tip pair and the wire 322 from the second ring/tip pair couple between the PSU 330 and the NID 302 to provide isolated DC power to the NID 302. The wire 314 from the first phone line 312 and the wire 320 from the second phone line 318 are not connected to the NID 302. The first and second phone lines provide two voice circuits to the residence and simultaneously provide a power circuit for the NID 302.

The PSU 330 includes a first converter 342 that receives AC input voltage, such as 110 volt (V) or 120V household, and converts that voltage to a ground referenced DC voltage such as 15V DC. The first converter 342 couples to a controller 336 and a battery charger 340. The battery charger 340 couples to a battery 338 that couples to the controller 336 as illustrated in FIG. 3. The battery 338 may be a 12 volt battery. The EIC 334 includes a second converter 335 that couples to the controller 336. The second converter 335 receives a ground referenced DC voltage from the controller 336 and then converts that voltage to the supplied isolated DC voltage, which may be 29V DC. The isolated DC voltage needs to be less than or equal to 30V to meet safety requirements for ungrounded voltage within a residence or building. The isolated DC voltage also needs to be sufficiently close to 30V to withstand voltage drops proportional to the distance across the phone lines for the power circuit that provides power to the NID 302.

The controller 336 selects between the battery 338 and the first converter 342 to provide the input ground referenced DC voltage of the second converter 335. The controller 336 selects the battery 338 if the AC voltage supplying the first converter 342 is not available.

As previously discussed, to avoid induction or conduction of electrical noise into the telephone wiring of the residence or building, the outgoing power conductors of the PSU 330 are not connected to earth ground. Because current leaves the PSU 330 on the wire 316 of the first phone line 312 and returns on the wire 322 of the second phone line 318, each telephone wire pair experiences no imposed current between the two wires which comprise one telephone pair. An imposed voltage of less than 5V may be developed which depends on the length of wires 316 and 322. Subscriber line interface circuits (not shown) that use line 312 and 318 can be made to compensate or null out the imposed voltage so as to not effect operation. For the same reason, no electrical impedance change is perceivable between the wires of any one telephone pair; allowing telephone use on each pair to proceed as if the power distribution scheme was not present.

To avoid similar problems with electrical noise, the power input circuitry of the NID 302 at the residential location is also not connected to earth ground. The power received at an input 305 of an electrical isolation component (EIC) 304 of the NID 302 is converted by a third converter 306 into power sources that may be referenced to earth ground (output 307) or referenced to yet another electrical node that is not connected to earth ground nor to any of the four wires used for telephone service within the building. Any one of isolated outputs 308 and 309 of the EIC 304 can be referenced to a node within any one telecommunications device such as a subscriber line interface circuit because any current which leaves that device (including that provided by its isolated power source) on one wire of its telephone signaling pair must return to it via it the other wire of its pair.

Thus, the power conducted through the four wire network can be used to power equipment on the same four wires without interfering with the operation of those pieces of equipment, as long as each powered device is isolated from ground and from the current loop which provides the power to the input of the NID 302.

Figure 4:
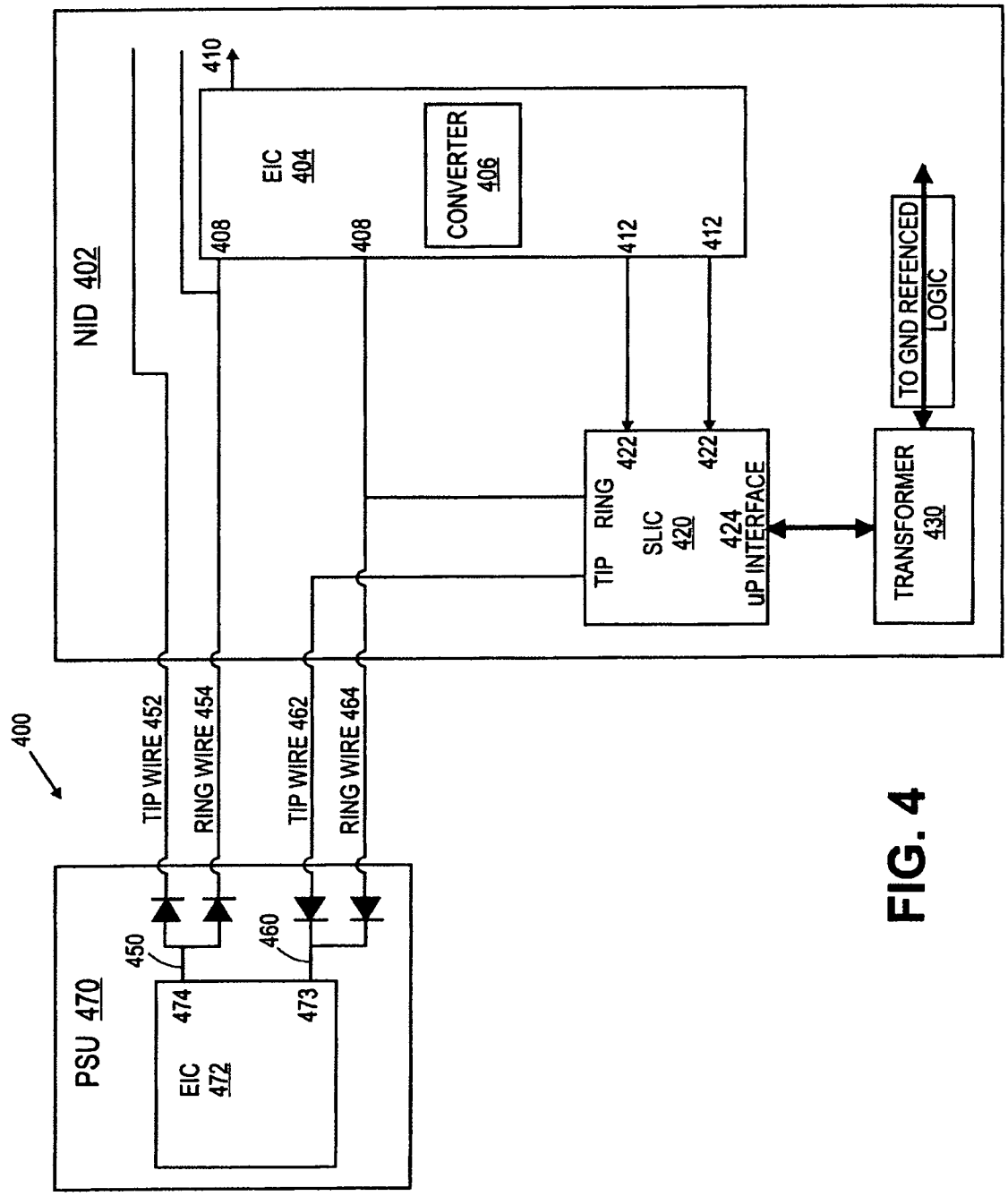
FIG. 4 shows a block diagram of another embodiment of providing DC power to a network interface device via telephone lines.

FIG. 4 shows a block diagram of another embodiment of providing DC power to a network interface device via telephone lines. The block diagram 400 includes a power supply unit (PSU) 470 with an electrical isolation component (EIC) 472 and ports 474 and 473 that couple via phone lines 450 and 460, respectively, to a network interface device (NID) 402. The NID 402 also includes an electric isolation component (EIC) 404 with a converter 406 and a subscriber line interface circuit (SLIC) 420. The SLIC 420 couples to the PSU 470 via a tip wire 462 and a ring wire 464 of the phone line 460. The SLIC 420 includes a microprocessor that couples to an isolation transformer 430. The isolation transformer 430, which includes multiple transformers, receives a plurality of digital signals from ground referenced logic contained in the NID 402.

The EIC 404 of the NID 402 receives isolated DC voltage from the PSU 470 via a ring wire 454 of phone line 450 and then converts that voltage into a supplied ground referenced DC voltage 410 and at least one isolated DC voltage 412. The EIC 404 provides isolated DC voltage to each SLIC, such as isolated DC voltage 412 being received by input 422 of the SLIC 420.

In one embodiment, the EIC 472 of the PSU 470 generates an isolated 29V DC power supply and sends this voltage via an output port 474 across the wire 454 to an input 408 of the EIC 404. The EIC 404 receives an isolated DC signal between 15 and 29 volts depending on the voltage drop or loss across tip wire 454. Then, a converter 406 of EIC 404 converts the received isolated DC signal into a 12V DC ground referenced supply within plus or minus 5 percent. The converter 406 also converts the received isolated DC signal into a 12V DC isolated supply that powers the input 422 of SLIC 420.

In another embodiment, the NID 402 includes two SLIC devices. Each SLIC device is coupled to a phone line and isolation transformer. Each SLIC device is powered with a 12V DC isolated supply received from output ports of EIC 404.

The SLIC 420 may drive telephones, thus enabling a virtual phone line. The residential gateway provides the termination point for the feed line, which may be xDSL feed line or fiber feed line if xPON. In addition to broadband media content, it will provide the IP connection necessary for VOIP. The voice data is encoded and decoded by a processor and sent through the subscriber line interface circuit (SLIC). The SLIC provides the central office functionality to any phones connected to the phone line. The SLIC has a phone filter in front of it to provide impedance isolation and filtering. The phone filter can be a multi-order bi-directional lowpass filter. The residential gateway may optionally have other communication ports on it, such as coaxial cable or wireless. The residential gateway may optionally support HPNA networking to enable media content delivery to HPNA devices such as set top boxes within the residence.

In one embodiment, the PSU 470 plugs into 120V AC mains and generates a 29 VDC power signal that is injected onto one wire of each phone line. It is to be appreciated that other voltages would also work.

Generation of the 29 VDC power signal may be accomplished by using a rectifier connected to a power amplifier. In an embodiment, the PSU 470 generates a 29V DC signal with a current limit of 1 ampere. The power rail for the power amplifier is made from rectified and filtered line voltage that may be transformer isolated. Diodes are shown on the output and input of the PSU 470 to allow TIP and RING telephone wiring reversals at the remote outdoor location, such as NID 402. The 29 VDC signal powers the NID 402. The NID 402 filters and converts the 29 V DC signal to a 12V DC signal. The filtered signals of positive and negative voltage are then used to feed the multitude of switching power supply regulator circuits that are required in the residential gateway. Similarly, the 12V DC SLIC power supply is DC isolated from all other power supplies.

In one embodiment, the NID 470 has a battery. This way, the NID 470 continues to function if a brown out occurs or if a user unplugs and replugs the power module.

Figure 5:
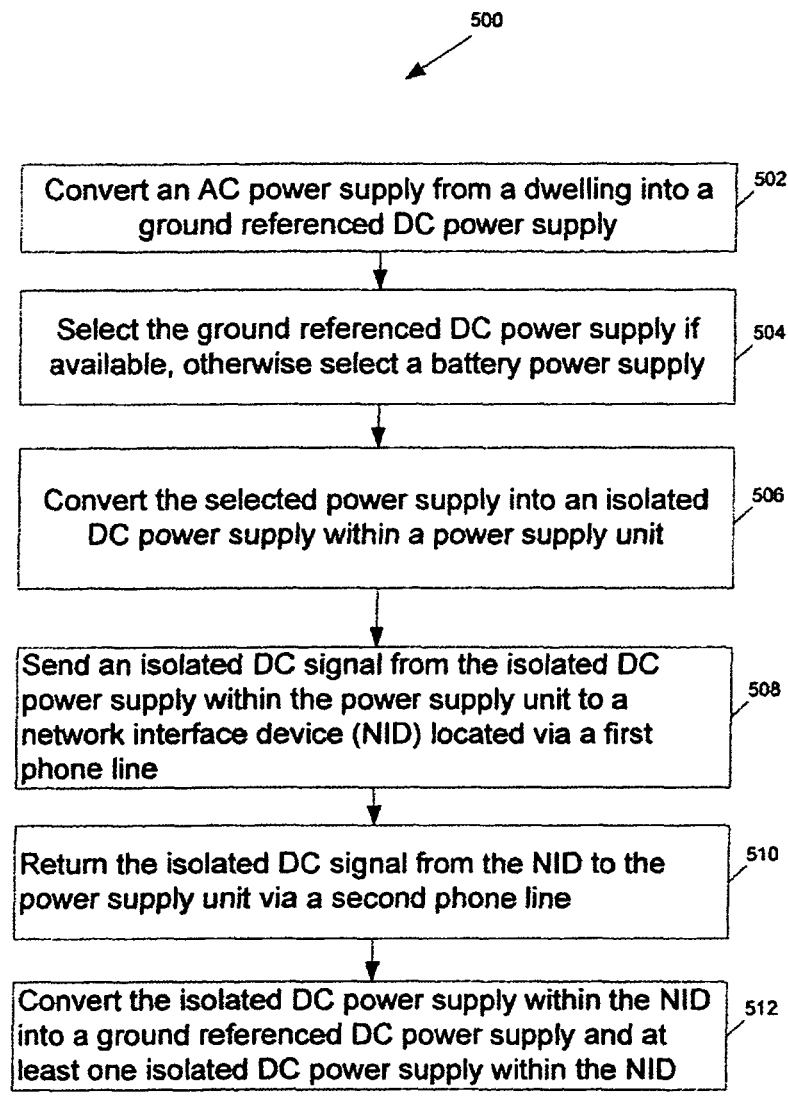
FIG. 5 shows a method for providing DC power to a network interface device via telephone lines.

FIG. 5 shows a method for providing DC power to a network interface device via telephone lines. The method 500 includes converting an AC power supply from a dwelling into a ground referenced DC power supply at block 502. The method 500 further includes selecting the ground referenced DC power supply if available, otherwise selecting a battery power supply at block 504. The method 500 further includes converting the selected power supply into an isolated DC power supply within a power supply unit at block 506. The method 500 further includes sending the isolated DC signal from the power supply unit located in the dwelling to a network interface device (NID) located outside a dwelling via a first phone line of a first ring/tip pair at block 508. The method 500 further includes returning the isolated DC signal from the NID to the power supply unit via a second phone line of a second ring/tip pair at block 510. The method 500 further includes converting the isolated DC power supply into a ground referenced DC power supply and at least one isolated DC power supply within the NID at block 512. The ground referenced DC power supply provides power to NID components not requiring isolated power. Each isolated DC power supply of the NID provides power to a subscriber line interface circuit (SLIC) that drives one phone line.

In one embodiment, because current leaves the power supply unit on one wire of the first phone line and returns on one wire of the second phone line, each telephone wire pair experiences no imposed current between the two wires which comprise one telephone pair. An imposed voltage of less than 5V may develop which depends on the length of the two wires. Subscriber line interface circuits that use the two wires can be made to compensate or null out the imposed voltage so as to not effect operation. For the same reason, no electrical impedance change is perceivable between the wires of any one telephone pair; allowing telephone use on each pair to proceed as if the power distribution scheme was not present. The first and second phone lines provide two voice circuits in the dwelling and simultaneously provide a power circuit for the NID.

Overall, the use of one wire from each telephone line to supply power to a remote communications device maintains the present signal to noise ratios on those lines without increasing the noise. Further, cross talk between the two discreet pairs is not significantly affected. Also, extra electro magnetic interference is not generated nor do violations of GR-1089 AC signal levels occur.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

Thus, according to embodiments of the present invention, systems and methods for providing DC power to a network interface device via telephone lines are described. The systems and methods enable a first phone line and a second phone line to provide two voice circuits in the dwelling and simultaneously provide a power circuit for the network interface device located outside a dwelling without needing separate wiring to power the network interface device.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components. The hardware logic may consist of electronic circuits that follow the rules of Boolean Logic, software that contain patterns of instructions, or any combination of both. The invention is to be understood as not limited by the specific embodiments described herein, but only by scope of the appended claims.

What is claimed is:

1. An apparatus comprising:
   a network interface device (NID) located outside a residence; and
   a power supply unit located inside the residence, the power supply unit having an electrical isolation component and one or more ports that couple via one wire of a first phone line and one wire of a second phone line to the NID to provide isolated direct current (DC) power to the NID,
   each of the first phone line and the second phone line provide a voice service to the residence while simultaneously providing a power circuit for supplying power to the NID;
   wherein the power supply unit comprises:
   a first converter to receive AC voltage and to convert that voltage to a ground referenced DC voltage, where the first converter couples to a controller and a battery charger;
   the battery charger couples to a battery that couples to the controller; and
   a second converter couples to the controller, wherein the second converter receives the ground referenced DC voltage and converts that voltage to the supplied isolated DC voltage.

2. The apparatus of claim 1, wherein the first phone line comprises one wire from a first ring/tip pair and the second phone line comprises one wire from a second ring/tip pair that couples between the power supply unit and the NID.

3. The apparatus of claim 2, wherein the electrical isolation component to generate the isolated DC power across one wire of the first ring/tip pair and one wire of the second ring/tip pair to generate the isolated DC signal with less than 5 volt DC bias between each wire in the first ring/tip pair and also between each wire in the second ring/tip pair.

4. The apparatus of claim 3, wherein the electrical isolation component to generate the isolated DC power across one wire of the first ring/tip pair and one wire of the second ring/tip pair to generate the isolated DC signal with approximately no alternating current (AC) impedance change between each wire in the first ring/tip pair and also between each wire in the second ring/tip pair.

5. The apparatus of claim 2, wherein the power supply unit having an output port from the one or more ports to send an isolated DC signal to the NID via the first phone line and an input port from the one or more ports to receive the isolated DC signal returning to the power supply unit via the second phone line.

6. The apparatus of claim 5, wherein the NID further comprises at least one subscriber line interface circuit (SLIC) having a microprocessor, each SLIC couples to one isolation transformer and one ring/tip pair.

7. The apparatus of claim 6, where the electrical isolation component of the NID to receive isolated DC voltage from the power supply unit and to convert that voltage into a supplied ground referenced DC voltage and at least one isolated DC voltage.

8. The apparatus of claim 7, wherein the electrical isolation component of the NID having output ports to provide isolated DC voltage to each SLIC.

9. The apparatus of claim 1, wherein the controller selects between the battery and the first converter to provide the input ground referenced DC voltage of the second converter.

10. The apparatus of claim 1, wherein a residential gateway to provide digital subscriber line service is located within the NID.

11. A method comprising:
sending an isolated direct current (DC) signal from a power supply unit located in a dwelling to a network interface device (NID) located outside a dwelling via a first phone line of a first ring/tip pair; and
returning the isolated DC signal from the NID to the power supply unit via a second phone line of a second ring/tip pair wherein each of the first phone line and the second phone line provide a voice service to the dwelling while simultaneously providing a power circuit for supplying power to the NID;
further comprising:
converting an AC power supply from the dwelling into a ground referenced DC power supply;
selecting the ground referenced DC power supply or a battery power supply;
converting the selected power supply into an isolated DC power supply within the power supply unit; and
converting the isolated DC power supply into a ground referenced DC power supply and at least one isolated DC power supply within the NID.

12. The method of claim 11, wherein selecting the battery power supply to occur if the ground referenced DC power supply is not available.

13. The method of claim 11, wherein each isolated DC power supply of the NID to provide power to a subscriber line interface circuit couples to one phone line.

14. An apparatus comprising:
means for sending an isolated direct current (DC) signal from a power supply unit located in a dwelling to a network interface device (NID) located outside a dwelling via a first phone line, which is one wire of a first ring/tip pair; and
means for returning the isolated DC signal from the NID to the power supply unit via a second phone line, which is one wire of a second ring/tip pair wherein each of the first phone line and the second phone line provide a voice service to the residence while simultaneously providing a power circuit for supplying power to the NID;
further comprising:
means for converting an alternating current (AC) power supply from the dwelling into a ground referenced DC power supply;
means for selecting the ground referenced DC power supply or a battery power supply;
means for converting the selected power supply into an isolated DC power supply within the power supply unit; and
means for converting the isolated DC power supply into a ground referenced DC power supply and at least one isolated DC power supply within the NID.

* * * * *